United States Patent
Kauffman

(10) Patent No.: US 7,900,507 B2
(45) Date of Patent: Mar. 8, 2011

(54) DEVICE AND METHOD FOR MONITORING THE QUALITY OF AN OIL CHANGE AND CONDITION OF ENGINE OIL FROM AN OIL CHANGE

(75) Inventor: Robert Kauffman, Centerville, OH (US)

(73) Assignee: University of Dayton, Dayton, OH (US)

(*) Notice: Subject to any disclaimer, the term of this patent is extended or adjusted under 35 U.S.C. 154(b) by 208 days.

(21) Appl. No.: 12/239,287

(22) Filed: Sep. 26, 2008

(65) Prior Publication Data

US 2009/0084171 A1 Apr. 2, 2009

Related U.S. Application Data

(60) Provisional application No. 60/975,826, filed on Sep. 28, 2007.

(51) Int. Cl.
G01M 15/04 (2006.01)
(52) U.S. Cl. ..................................... 73/114.55
(58) Field of Classification Search ................. 73/53.05, 73/54.02, 114.55
See application file for complete search history.

(56) References Cited

U.S. PATENT DOCUMENTS

| | | | | |
|---|---|---|---|---|
| 4,118,973 A * | 10/1978 | Tucker et al. | ................. | 73/54.07 |
| 4,721,874 A * | 1/1988 | Emmert | ................. | 310/333 |
| 5,262,732 A * | 11/1993 | Dickert et al. | ................. | 324/672 |
| 5,377,531 A * | 1/1995 | Gomm | ................. | 73/53.05 |
| 5,523,692 A * | 6/1996 | Kuroyanagi et al. | ......... | 324/438 |
| 5,936,414 A * | 8/1999 | Tseng | ................. | 324/696 |
| 6,204,656 B1 * | 3/2001 | Cheiky-Zelina et al. | .... | 324/71.4 |
| 6,433,560 B1 * | 8/2002 | Hansen et al. | ................. | 324/668 |
| 6,452,179 B1 * | 9/2002 | Coates et al. | ............. | 250/339.09 |
| 6,561,010 B2 * | 5/2003 | Wilson et al. | ................. | 73/54.04 |
| 6,718,819 B2 * | 4/2004 | Schoess | ................. | 73/53.05 |
| 6,850,865 B2 * | 2/2005 | Hirthe et al. | ................. | 702/181 |
| 6,917,865 B2 * | 7/2005 | Arai et al. | ................. | 701/30 |
| 7,043,967 B2 * | 5/2006 | Kauffman et al. | ............ | 73/53.01 |
| 7,143,867 B2 * | 12/2006 | Chopra | ................. | 184/103.2 |
| 7,259,575 B2 * | 8/2007 | Lvovich et al. | ................. | 324/698 |
| 7,281,414 B2 | 10/2007 | Cho | | |
| 7,541,004 B2 * | 6/2009 | Niksa et al. | ................. | 422/82.02 |
| 7,729,870 B2 * | 6/2010 | Sun | ................. | 702/52 |
| 2006/0105467 A1 * | 5/2006 | Niksa et al. | ................. | 436/150 |
| 2009/0216464 A1 * | 8/2009 | Kong et al. | ................. | 702/25 |
| 2010/0127718 A1 * | 5/2010 | Albertson et al. | ............ | 324/694 |

* cited by examiner

Primary Examiner — Freddie Kirkland, III
(74) Attorney, Agent, or Firm — Dinsmore & Shohl LLP

(57) ABSTRACT

A device and method for measuring the quality of a vehicle oil change and the condition of oil obtained during an oil change is provided which includes an oil measurement compartment and at least one coolant sensor. The oil measurement compartment includes a conductivity sensor including a pair of horizontal parallel wires and a pair of vertical parallel wires which are capable of measuring the quantity, temperature, and conductivity of the drained oil. The coolant sensor is comprised of a hydrophilic material in contact with a permanent surface comprised of two spaced apart metal wires or traces. The coolant sensor measures the viscosity, coolant concentration, and overall condition of the oil.

7 Claims, 2 Drawing Sheets

FIG. 1

DEVICE AND METHOD FOR MONITORING THE QUALITY OF AN OIL CHANGE AND CONDITION OF ENGINE OIL FROM AN OIL CHANGE

CROSS-REFERENCE TO RELATED APPLICATIONS

This application claims the benefit of U.S. Provisional Application No. 60/975,826, filed Sep. 28, 2007, entitled OIL MONITORING DEVICE AND METHOD. The entire contents of said application are hereby incorporated by reference.

BACKGROUND OF THE INVENTION

The present invention is directed to a device and method for monitoring the quality of an oil change performed on a vehicle, and more particularly, to a device and method which includes sensors for evaluating the quality of the oil change as well as the condition of oil drained from a vehicle engine during an oil change.

Engine oil generally functions to reduce friction, cool down the engine, remove wear debris, seal, clean, and prevent rust in a vehicle engine. However, as the engine oil is used, these functions become less effective. For example, since engine oil is used under high temperature conditions in the combustion chamber, the oil becomes oxidized and materials generated by combustion are incorporated in the engine oil. In addition, fuel, coolants, water, or other additives may leak into the engine oil. These contaminants/conditions affect the viscosity of the engine oil, i.e., depending on the conditions the oil is subjected to, it may increase or decrease in viscosity.

In addition, as engine oil is comprised of various materials and additives and is chemically and physically diverse, its quality may also change during vehicle operation according to the degree of oxidation, the condition of the engine, the kind of fuel used, driving conditions, as well as environmental conditions.

Conventional methods for monitoring engine oil include a low oil pressure light installed in a vehicle instrument panel which signals the onset of an unacceptable oil level, and thus, the need for the oil to be changed. However, at this point, the engine may have already incurred damage, as a low oil level can be indicative of a number of different engine problems.

It would be desirable to be able to monitor the quality and/or condition of engine oil to determine the specific physical properties of the oil and thus provide an indication of any potential engine problems which need to be addressed.

Accordingly, there is still a need in the art for a device and method of monitoring the quality of an oil change and the condition of drained engine oil to detect engine defects.

SUMMARY OF THE INVENTION

Embodiments of the present invention meet those needs by providing a device and method for monitoring both the quality of the engine oil change and the condition of the oil from the oil change to identify specific engine problems. The device is designed to be used when the oil of a vehicle engine is changed, i.e., when the oil is drained from the engine. Based on the measurements obtained from the device, specific engine problems may be identified such as coolant intrusion, fuel dilution, severe oxidation, and hot spots/overheating.

According to one embodiment of the present invention, a device for measuring the quality of an oil change and the condition of oil drained from a vehicle engine is provided which comprises an oil measurement compartment including a conductivity sensor comprising a pair of horizontal parallel wires and a pair of vertical parallel wires. In one embodiment, the oil measurement compartment further includes at least one thermistor or any other temperature measuring device. The oil measurement compartment functions to measure the quantity, conductivity, and temperature of oil drained from a vehicle.

The device also includes at least one coolant sensor comprising a permanent surface including two spaced apart metal wires or traces and a hydrophilic material in contact with the wires or traces. In one embodiment, the device includes at least two coolant sensors. In another embodiment, at least one coolant sensor is positioned in the oil measurement compartment and the other coolant sensor is positioned on a funnel through which oil is passed from the oil measurement compartment. In still another embodiment, two coolant sensors are positioned on opposite sides of the funnel.

In another embodiment, the device includes at least one flow valve for controlling the flow of oil from the oil measurement compartment to the coolant sensor. In one embodiment, the device includes two flow valves.

In another embodiment, the device further includes a used oil storage reservoir for storing the oil after it has been evaluated in the device.

In the method of measuring the quality of the oil change and condition of oil drained from a vehicle engine, oil is drained from a vehicle engine into the oil measurement compartment and the quantity, temperature, and conductivity of the oil is measured. Oil is then allowed to flow out of the oil measurement compartment via the flow valve(s) into the funnel containing at least one coolant sensor to determine the viscosity, coolant concentration, and overall condition of the oil. After the oil has been evaluated, it is then passed from the funnel into the oil storage reservoir.

These, and other features and advantages of the present invention, will become apparent from the following detailed description, the accompanying drawings, and the appended claims.

BRIEF DESCRIPTION OF THE DRAWINGS

In the following drawings, like structures are indicated with like reference numerals, in which.

DETAILED DESCRIPTION OF PREFERRED EMBODIMENTS

Embodiments of the invention provide a significant improvement over prior monitoring devices in that the device can be used to measure the quality of the oil change performed on a vehicle engine and the condition of the oil, both of which can help to identify potential engine problems. For example, the quality of the oil change can be determined from the quantity and/or temperature of the drained oil determined from the oil measurement compartment. In addition, the results obtained from the coolant sensor measurements may also be used to determine the condition of the oil and to identify specific engine problems, including, but not limited to coolant intrusion, fuel dilution (viscosity decrease), severe oxidation (viscosity increase) and possible hot spots/overheating (high conductivity readings). The device and method described herein may be used in any environment in which oil changes are performed such as quick oil change shops, dealerships, truck stops, and the like.

While the invention is described for use primarily with engine oils, it should be appreciated that the device and method may also be used on fluids that are exposed to oxidation/water intrusion from the environment, such as transmission fluids, gear box oils (wind turbines as well as truck axles), and industrial equipment such as paper mills.

Figures 1, 1A:
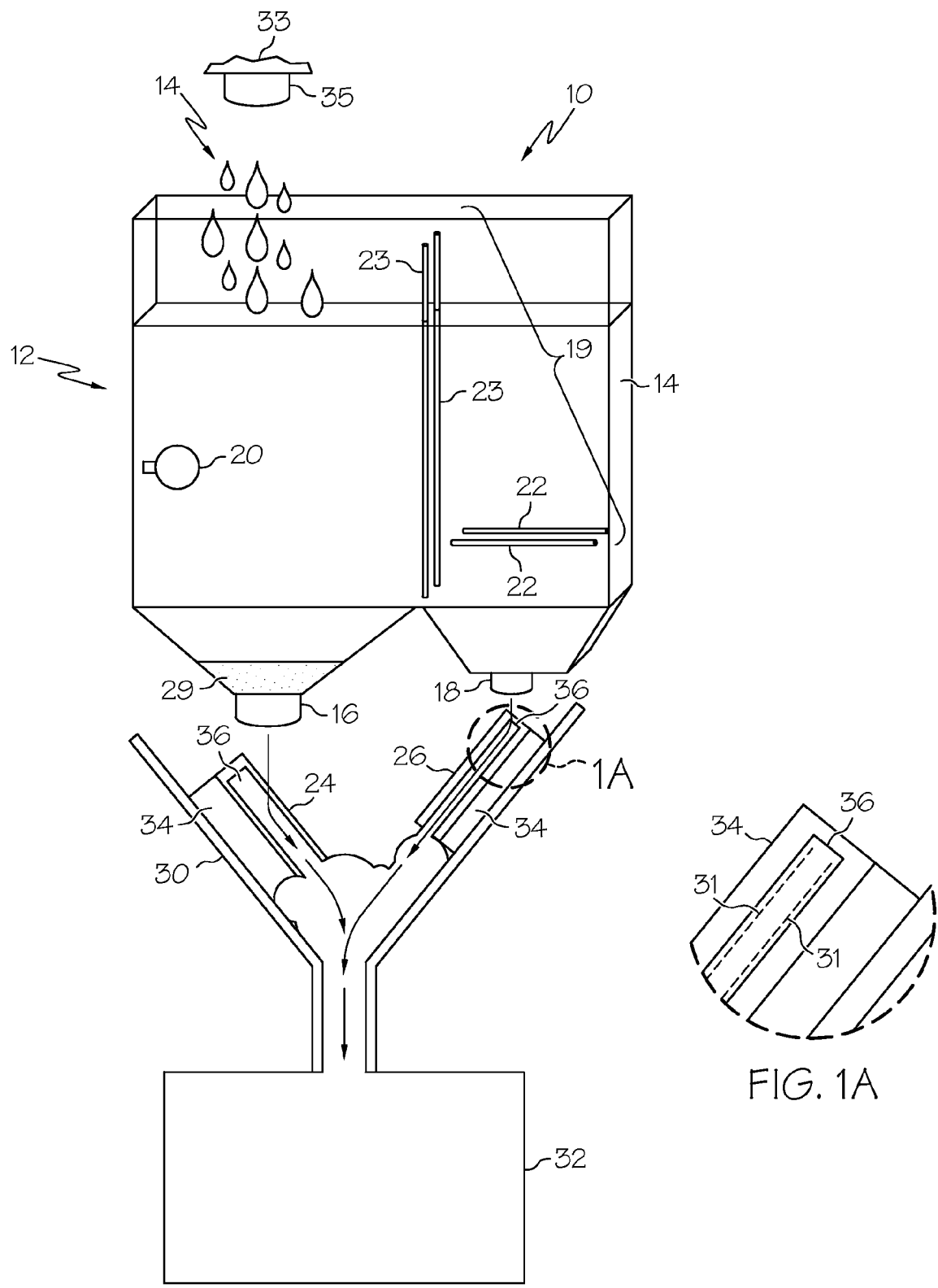
FIG. 1 is a perspective view of a block diagram representation of an oil monitoring device according to an embodiment of the invention.
FIG. 1A is a cross-sectional view of an embodiment shown in FIG. 1.

Referring now to FIG. 1, one embodiment of an oil monitoring device 10 is shown which includes at least one oil measurement compartment 12 and at least one coolant sensor 24. In one embodiment, the device includes at least two coolant sensors 24, 26 which are positioned on the angled sides of a funnel 30.

The oil measurement compartment 12 functions to measure the temperature, quantity, and conductivity of oil 14 drained from a vehicle oil pan 33. The oil measurement compartment may be formed from a chemically resistant, non-stick, non-conductive material such as high density polyethylene, Teflon, glass, machinable ceramic, or the like. The compartment may also include an outer insulating layer to maintain the oil temperature during analysis.

The oil measurement compartment 12 further includes a thermistor 20 or other temperature measuring device which is used to measure the temperature of the oil and confirm that the drained oil 14 is still warm, i.e., above room temperature to ensure rapid oil flow from the engine and to ensure that any contaminants from the in-service oil are suspended prior to the oil change process to ensure their removal from the engine.

The oil measurement compartment 12 also includes a conductivity sensor, generally indicated by reference numeral 19. In one embodiment, the sensor 19 comprises a set of horizontal parallel metal wires 22 and a set of vertical parallel metal wires 23 for determining the level/quantity of the oil drained from the engine. The level/quantity of oil is determined by the output of the vertical parallel wires, which increases as the oil level covering their surface increases. Consequently, the ratio of the vertical wire output/horizontal wire output is directly related to the oil level, and after calibration, is directly related to the oil quantity. The level/quantity results are then compared with known engine oil capacity to evaluate the completeness of the oil change.

The metal wires 22, 23 may comprise stainless steel, nickel, chrome, gold plated copper, or any other non-corrodible material or conductive plastic. Both sets of parallel metal wires 22, 23 measure the conductivity of the used oil covering their surfaces. As the horizontal wire pair 22 is always submerged in the oil, their output is constant as the container fills/empties and can therefore be used as the reference conductivity value for the drained oil.

It should be appreciated that while the conductivity sensor 19 comprises the parallel metal wires 22, 23, other level sensing systems (optical, acoustic, mechanical float, etc.) may also be used in other embodiments. In other embodiments, metal traces (such as gold, nickel, gold plated copper, or any other non-corrodible metal) on non-conductive polymeric substrates could also be used in place of the horizontal wires 22, vertical wires 23, or both, as long as they are capable of providing a measurement of oil quantity.

Referring again to FIG. 1, the device 10 includes flow valves 16, 18 which allow the oil 14 to flow through to the oil measurement compartment 12 to the coolant sensors 24, 26. It should be noted that any coolant, dirt, or other insoluble contaminants 29 that have pooled/accumulated in the engine's oil pan during use will concentrate on the left side of the compartment 12 above the left flow valve 16, since they will flow/settle directly down from the oil pan's drain 35 to the bottom of the compartment 12 as shown.

When the engine oil drainage is complete and the drained oil temperature and quantity is recorded, the flow valves 16, 18 on the bottom of the oil measurement compartment are electronically or manually opened to allow the used oil to flow out of the compartment onto coolant sensors 24, 26 which are positioned on funnel 30 or any other similarly angled structure and into a used oil storage reservoir 32. As shown in FIG. 1, the left flow valve 16 allows the coolant, dirt, or other insoluble contaminants 29 that have pooled/accumulated in the engine's oil pan during use to flow first out of the compartment 12 onto the left coolant sensor 24. The right flow valve 18 will allow only drained oil representative of the bulk of the engine's in-service oil to drain onto the right coolant sensor 26.

The coolant sensor(s) 24, 26 are comprised of a permanent surface 34 and a hydrophilic, oil repellant material 36. In one embodiment, the permanent surface 34 includes two spaced apart parallel wires, rods, or traces 31 as shown in close-up sectional view FIG. 1A. In another embodiment, two spaced apart metal wires may be molded into a non-conductive rod so that only the wires' tips (flush with rod surface) are visible. In yet another embodiment, two spaced apart metal wires are traces on a non-conductive surface. The metals may be the same as those used for the conductivity sensors (stainless steel, nickel, chrome, gold plated copper, or any other non-corrodible metal).

The hydrophilic material 36 is non-conductive and may comprise paper, nylon, sodium polyacrylate, molecular sieves, glass wool, etc. and can be in the form of a film, liner, filter, coating, honeycomb, or the like. For example, the coolant sensors in the illustrated embodiment of FIG. 1 utilize flat hydrophilic films such that all of the oil makes contact with the hydrophilic material as it flows across the sensor surface.

The hydrophilic material 36 is positioned on the permanent surface 34 so as to make contact with both metal wires/traces 31. When the hydrophilic material 36 is brought into contact with oil, it becomes covered with oil but remains non-conductive. However, when the hydrophilic material 36 is brought into contact with oil containing suspended/dispersed water, the water is extracted from the oil and accumulates in the hydrophilic material. The amount of water that needs to be extracted from the oil to make the hydrophilic material conductive is dependent on the amount of material in contact with the metal surfaces, the affinity of the material for the water, the presence of water soluble salts/water adsorbing particles, spacing of the metal surfaces, etc. The coolant sensor(s) 24, 26 can be made to be sensitive to as little as 10 micrograms of water (small amount of material, closely spaced metal surfaces, salts present) or insensitive to water quantities below 1 gram (large amount of material, widely spaced metal surfaces, water adsorbent particles that must be saturated prior to total material becoming conductive). The amount of water is compared to the amount of drained oil to determine the presence/severity of coolant leaks. For example, the amount of water in 1 mL of used oil with 2500 ppm contamination (severe coolant leak) is equal to the water in 10 mL of used oil with 250 ppm contamination (normal operation).

Figure 2:
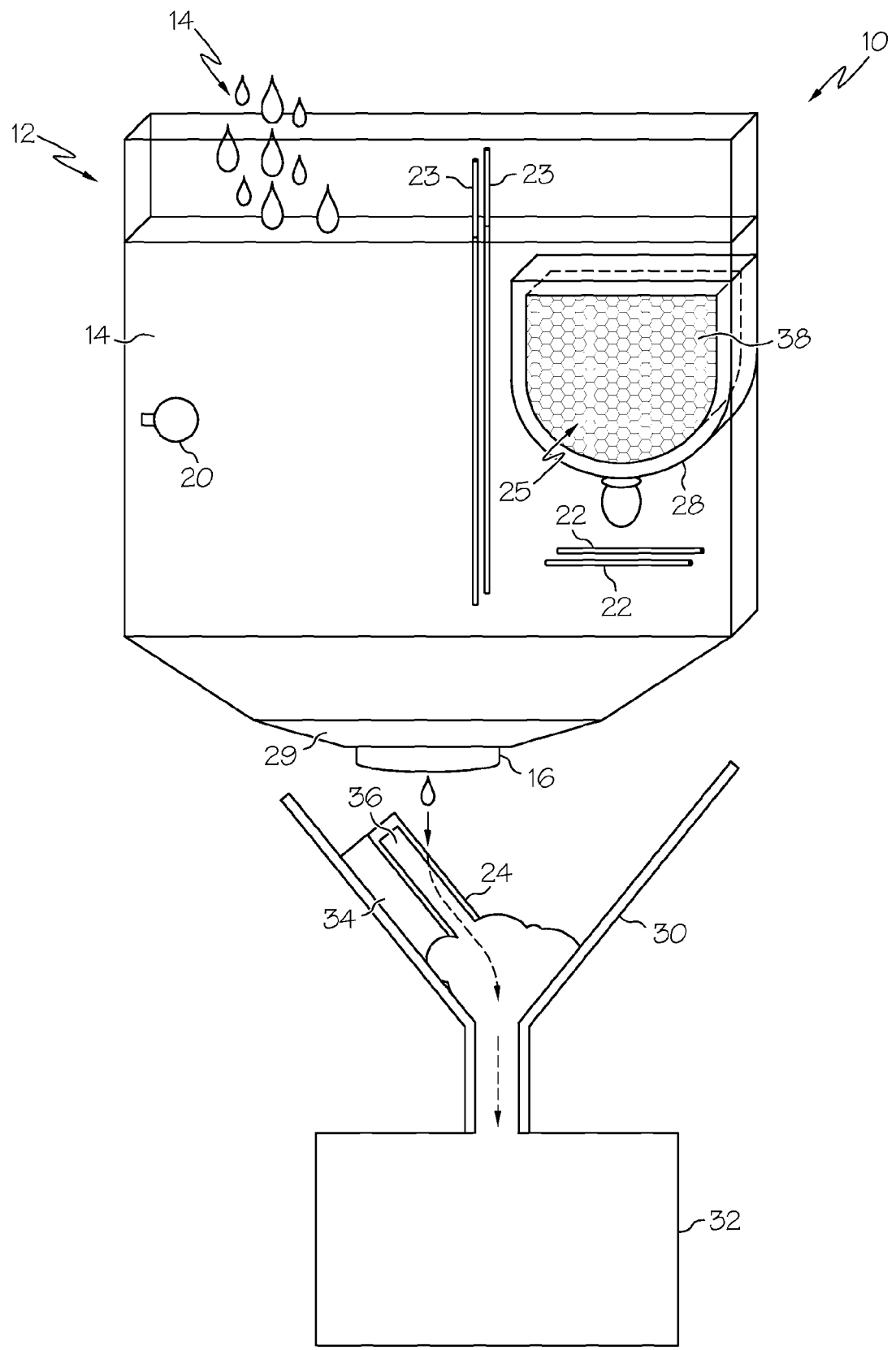
FIG. 2 is a perspective view of a block diagram representation of an oil monitoring device according to another embodiment of the invention.

Referring now to FIG. 2, another embodiment of the device 10 is shown in which like elements have like reference numerals. The device of FIG. 2 is similar to that of FIG. 1 except that a portion of the drained engine oil 14 is isolated in an overflow cup 28 (when the oil level rises above the cup wall, the cup fills) which includes a coolant sensor 25. This arrangement allows control of the amount of oil that comes into contact with the coolant sensor 25 and ensures that sensor 25 is only exposed to a set quantity of drained oil which is representative of the bulk of the engine's in-service oil. When the device is in use, any coolant, dirt or other insoluble contaminants 29 that have accumulated in the engine's oil pan during use will concentrate away from the overflow cup 28.

In contrast to the coolant sensors 24, 26 of FIG. 1, in FIG. 2, the hydrophilic (adsorbent) material of the coolant sensor 25 in the overflow cup 28 must be designed to increase the oil:material interactions, such as with the use of a honeycomb adsorbent material 38 filling the cup or lining the interior surfaces of the cup as shown. Increasing the surface area of the hydrophilic material in the cup increases the oil:adsorbent interactions, making the water extraction from the isolated oil more efficient with shorter residence times. As an alternative to the honeycomb material, metal traces spaced less than 75 microns on non-conductive surfaces may be used and have been shown to be sensitive to 2500 ppm contamination levels.

When the oil measurement compartment 12 is completely drained of oil (oil is no longer in contact with the horizontal wire pair), oil condition evaluations can be performed based on the individual/combined sensor readings to identify specific engine problems such as coolant intrusion, severe fuel dilution, oxidation, and hot spot/overheating. For example, to determine whether coolant intrusion has taken place, if the coolant sensor 24 of the device of FIG. 1 or FIG. 2 shorts out, this is an indication that coolant/water has pooled in the oil pan of the engine since the last oil change. However, the severity of the coolant leak is unknown since the length of time required to produce the coolant pool is unknown (factors include oil dispersancy, engine temperature, leak rate, etc.) In this instance, the coolant sensor 26 of FIG. 1 or the coolant sensor 25 of FIG. 2 is used to assess the severity of the coolant leak. Since the quantity of oil coming into contact with the sensor is known (the quantity drained from the engine is known) and the sensitivity of the coolant sensor has been established with known standards, then the coolant/water concentration of the drained oil can be determined, and consequently, the severity of the coolant leak can also be determined. Generally, the sensor sensitivity decreases as the hydrophilic material size and metal wire/trace spacing increases. Oils can be tested to a particular water/coolant concentration to determine the dimensions of the sensor needed for the desired sensitivity. This is dependent on the condemnation level of the use to minimize the possibility of a "false positive," i.e., the sensor detects a leak, but no leak is found upon engine tear down/inspection. The U.S. Army uses a condemnation level of 2500 ppm while some trucking companies use a level of 5000 ppm to ensure that the leak is severe enough to cause damage and can be located upon engine tear down.

The coolant sensor 26 in FIG. 1 can be set to short out at coolant concentrations above 2500 ppm since it is indicative of an active coolant leak. Based on the outputs of both coolant sensors in FIG. 1 or 2, the system can provide information on severity/timing of the leak, e.g., if both sensors short out, there is an active, severe leak; if only coolant sensor 24 shorted out, then there is an accumulation in the pan (probably due to low engine temperature) and the leak if any, is minor and/or just initiating; if only coolant sensor 26 (FIG. 1) or sensor 25 (FIG. 2) shorted out, then the leak is active but probably recent and the oil dispersancy is still effective.

To determine whether severe fuel dilution and oxidation has occurred, the oil temperature and quantity obtained from the oil measurement compartment are used along with the rate at which the oil drains from the compartment (rate at which the vertical wire output changes) and the time for entire compartment to empty (horizontal wire output goes to zero), which is directly proportional to the thickness of the drained oil. Thus, the oil temperature and drainage rate/time to empty can be used to calculate the oil's viscosity. It should be appreciated that the compartment must first be calibrated with oils of known viscosities and temperatures.

If the calculated viscosity/drainage rate is less than 50% of the expected value, then the drained engine is experiencing severe fuel dilution. Conversely, if the calculated viscosity/drainage rate is greater than 150% of the expected value, then the drained engine is experiencing severe oxidation. It should be appreciated that the viscosity of the drained oil being out-of-spec (e.g., 10W40 is used instead of 5W30) could also be the result of an out-of-spec new oil being used in the drained engine, which is also of value to the user.

During hot spots or overheating, excessive heat will cause the anti-wear additives in the oil to breakdown, producing highly conductive species. If the oil conductivity sensor is greater than 200% of the new oil value and the coolant sensors do not detect suspended coolant present, then the engine is experiencing hot spots/overheating.

Having described the invention in detail and by reference to preferred embodiments thereof, it will be apparent that modifications and variations are possible without departing from the scope of the invention.

What is claimed is:

1. A device for monitoring the quality of an oil change and condition of oil drained from a vehicle engine comprising:
    at least one oil measurement compartment including a conductivity sensor comprising a pair of horizontal parallel wires and a pair of vertical parallel wires;
    at least one coolant sensor comprising a permanent surface comprising two spaced apart metal wires or traces and a hydrophilic material in contact with said wires or traces; and
    at least one flow valve positioned at the bottom of said oil measurement compartment for controlling the flow of oil from said oil measurement compartment to said coolant sensor.

2. The device of claim 1 wherein said oil measurement compartment further includes at least one thermistor.

3. The device of claim 1 including at least two coolant sensors.

4. The device of claim 3 wherein at least one coolant sensor is positioned in said oil measurement compartment.

5. The device of claim 1 including two flow valves.

6. The device of claim 1 further including an oil storage reservoir.

7. A method for measuring the quality of an oil change and condition of oil drained from a vehicle engine comprising:
    providing an oil monitoring device comprising an oil measurement compartment including a conductivity sensor comprising a pair of horizontal parallel wires and a pair of vertical parallel wires; and at least one coolant sensor comprising a permanent surface comprising two spaced apart metal wires or traces and a hydrophilic material in contact with said wires or traces;
    draining oil from said vehicle engine into said oil measurement compartment and determining the quantity, temperature, and conductivity of said oil;
    allowing said oil to flow out of said oil measurement compartment onto said coolant sensor to determine the viscosity, coolant concentration, and condition of said oil.

* * * * *